(12) United States Patent
Hu

(10) Patent No.: US 9,066,605 B2
(45) Date of Patent: Jun. 30, 2015

(54) SEAT UNIT FOR CHILD AND A WHEELED CHILD CONVEYANCE USING IT

(71) Applicant: Goodbaby Child Products Co., Ltd, Kunshan (CN)

(72) Inventor: Jie Hu, Kunshan (CN)

(73) Assignee: Goodbaby Child Products Co., Ltd, Jiangsu (CN)

( * ) Notice: Subject to any disclaimer, the term of this patent is extended or adjusted under 35 U.S.C. 154(b) by 0 days.

(21) Appl. No.: 13/651,847

(22) Filed: Oct. 15, 2012

(65) Prior Publication Data

US 2014/0027992 A1 Jan. 30, 2014

(30) Foreign Application Priority Data

Jul. 24, 2012 (CN) .......................... 2012 2 0360277

(51) Int. Cl.
*B62B 7/06* (2006.01)
*A47D 1/02* (2006.01)
*B62B 7/00* (2006.01)
*B62B 9/10* (2006.01)

(52) U.S. Cl.
CPC ... *A47D 1/02* (2013.01); *B62B 7/00* (2013.01); *B62B 9/102* (2013.01); *B62B 2205/00* (2013.01)

(58) Field of Classification Search
USPC .......................... 280/642–643, 647, 648, 650, 280/47.38–47.41, 657–658
See application file for complete search history.

(56) References Cited

U.S. PATENT DOCUMENTS

| 4,191,397 A * | 3/1980 | Kassai ........................... 280/647 |
| 8,210,562 B2 * | 7/2012 | Ohnishi ........................ 280/642 |
| 2008/0211206 A1 * | 9/2008 | Thorne et al. ................. 280/650 |

* cited by examiner

*Primary Examiner* — Jeffrey J Restifo
*Assistant Examiner* — Erez Gurari
(74) *Attorney, Agent, or Firm* — Stites & Harbison PLLC; Cong Ding

(57) ABSTRACT

A seat unit for child is disclosed in the invention, which comprises a seat frame and locking devices. The seat frame includes a framework, a left lower bracket, a left upper bracket with one end being rotatably connected to one end of the left lower bracket by a left first shaft, a right lower bracket, and a right upper bracket with one end being rotatably connected to one end of the right lower bracket by a right first shaft. The other end of the left lower bracket is rotatably connected to the other end of the right lower bracket, and the other end of the left upper bracket is rotatably connected to the other end of the right upper bracket. The axis of the left first shaft and the axis of the right first shaft extend along the left-right direction respectively.

7 Claims, 6 Drawing Sheets

SEAT UNIT FOR CHILD AND A WHEELED CHILD CONVEYANCE USING IT

CROSS REFERENCE TO RELATED APPLICATIONS

This application claims the benefit of People's Republic of China application Serial No. 201220360277.1, filed Jul. 24, 2012, under 35 USC Sec. 119(a) hereby specifically incorporated by reference in its entirely.

FIELD OF THE INVENTION

The invention relates to a seat unit or child and a wheeled child conveyance using the seat unit.

DESCRIPTION OF THE RELATED ART

The seat unit of the prior art, such as Chinese Patent Publication No. 2739059, comprises a seat plate, a pedal mechanism with its rear end being rotatably connected to a front end of the seat plate, and a second backrest frame with its front end being rotatably connected to a rear end of the seat plate, and also includes a framework, a first backrest frame with one end being rotatably connected to the rear end of the second backrest frame and the other end being rotatably connected to a rear end of the framework, and a framework support rod with a lower end being rotatably connected to the seat plate and an upper end being rotatably connected to the framework. Wherein the front end of the pedal mechanism is rotatably connected to a front end of the framework, and the pedal mechanism comprises a pedal member and a pedal connecting frame. The pedal member is foldably connected to the pedal connecting frame.

SUMMARY OF THE INVENTION

One technical problem to be solved by the present invention is to provide a seat unit for child.

In order to solve the above-mentioned technical problem, the following technical solution is disclosed in the present invention: a seat unit for child comprising a seat frame having an unfolded position and a folded position, a seat cover disposed on the seat frame, and locking devices for locking the seat frame in the unfolded position. The seat frame comprises a framework which is configured as a closed frame when the seat frame is in the unfolded position. The seat frame comprises a left lower bracket located on a left side of the seat frame, a left upper bracket with one end being rotatably connected to one end of the left lower bracket by a left first shaft, a right lower bracket located on a right side of the seat frame, and a right upper bracket with one end being rotatably connected to one end of the right lower bracket by a right first shaft, the other end of the left lower bracket being rotatably connected to the other end of the right lower bracket, the other end of the left upper bracket being rotatably connected to the other end of the right upper bracket. The shaft axis of the left first shaft and the shaft axis of the right first shaft each extends along a left-right direction respectively. When the seat frame is in the folded position, the other end of the left lower bracket and the other end of the left upper bracket draw together, the other end of the right lower bracket and the other end of the right upper bracket draw together, and the left first shaft and the right first shaft draw together.

In some embodiments, the shaft axis of the left first shaft and the shaft axis of the right first shaft coincide.

In some embodiments, the other end of the left lower bracket is rotatably connected to the other end of the right lower bracket by a second shaft, and the left first shaft and the right first shaft being spatially perpendicular to the second shaft respectively.

In some another embodiments, the framework further comprises an upper connecting member, the other end of the left upper bracket being rotatably connected to one end of the upper connecting member by a third shaft, the other end of the right upper bracket being rotatably connected to the other end of the upper connecting member by a fourth shaft, and the left first shaft and the right first shaft being spatially perpendicular to the third shaft and the fourth shaft respectively.

In some still another embodiments, the seat unit further includes a left seat rod with one end being fixed on the left lower bracket, and a right seat rod with one end being fixed on the right lower bracket, when the seat frame is in the unfolded position, the left seat rod stretches backwardly from the left lower bracket, and the right seat rod stretches backwardly from the right lower bracket In some further embodiments, the seat cover includes a seat portion disposed on the left seat rod and the right seat rod.

In some embodiments, the locking devices includes a left locking device disposed between one end of the left lower bracket and one end of the left upper bracket, and a right locking device disposed between one end of the right lower bracket and one end of the right upper bracket.

Another technical problem to be solved by the present invention is to provide a wheeled child conveyance.

In order to solve the above-mentioned problem, the following technical solution is disclosed in the invention: a wheeled child conveyance comprising the child seat unit of any one of the above technical solutions, which includes a cart frame, multiple groups of wheel assembly disposed on the bottom of the cart frame, and the child seat unit being detachably disposed on the cart frame.

The protecting scope of the present invention is not limited to the technical solutions combined particularly by the above-mentioned technical features, other technical solutions combined discretionarily by the above-mentioned technical features or equivalent features should also be covered in the invention, such as the technical solutions formed by exchanging the aforementioned features with the technical features having the similar functions, including but not limited to, disclosed in the invention.

The advantages of the invention over the prior art is as follows: a child seat unit involving new folding conception is disclosed in the invention, during the folding of the seat unit, the left lower bracket and the left upper bracket rotate around the left first shaft respectively and further draw together, also, the right lower bracket and the right upper bracket rotate around the right first shaft respectively and further draw together, so that the size of the child seat unit in anteroposterior direction becomes smaller, thereby the left first shaft and the right first shaft draw together and the size of the child seat unit in left-right direction also becomes smaller, therefore, the child seat unit and thus the wheeled child conveyance using it can have reduced volume after folding and thus be stored or transported more conveniently.

wherein, 1. Seat frame; 2. Seat cover; 3. Framework; 4. Left lower bracket; 5. Left upper bracket; 6. Right lower bracket; 7. Right upper bracket; 8. Upper connecting member; 9. Left seat rod; 10. Right seat rod; 11. Tarpaulin rod frame; 12. Left first shaft; 13. Right first shaft; 14. Second shaft; 15. Third shaft; 16. Fourth shaft.

DESCRIPTION OF PREFERRED EMBODIMENTS

Figure 1:
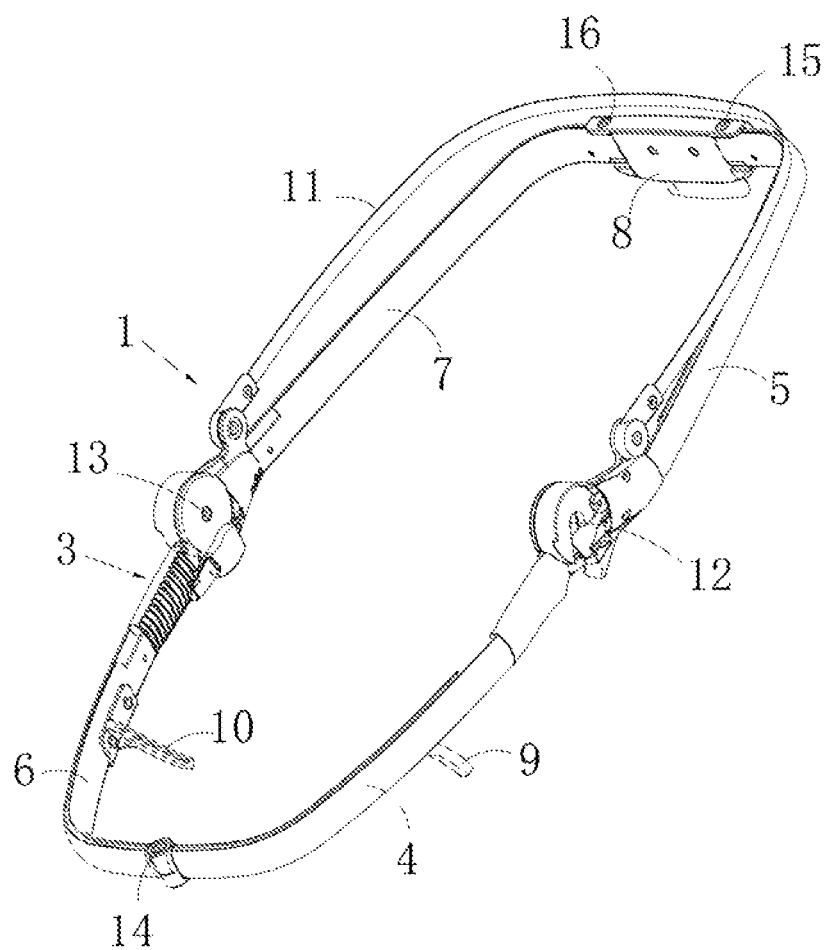
FIG. 1 is a perspective view of a seat frame according to the invention, wherein the seat frame is in an unfolded status.
Figure 2:
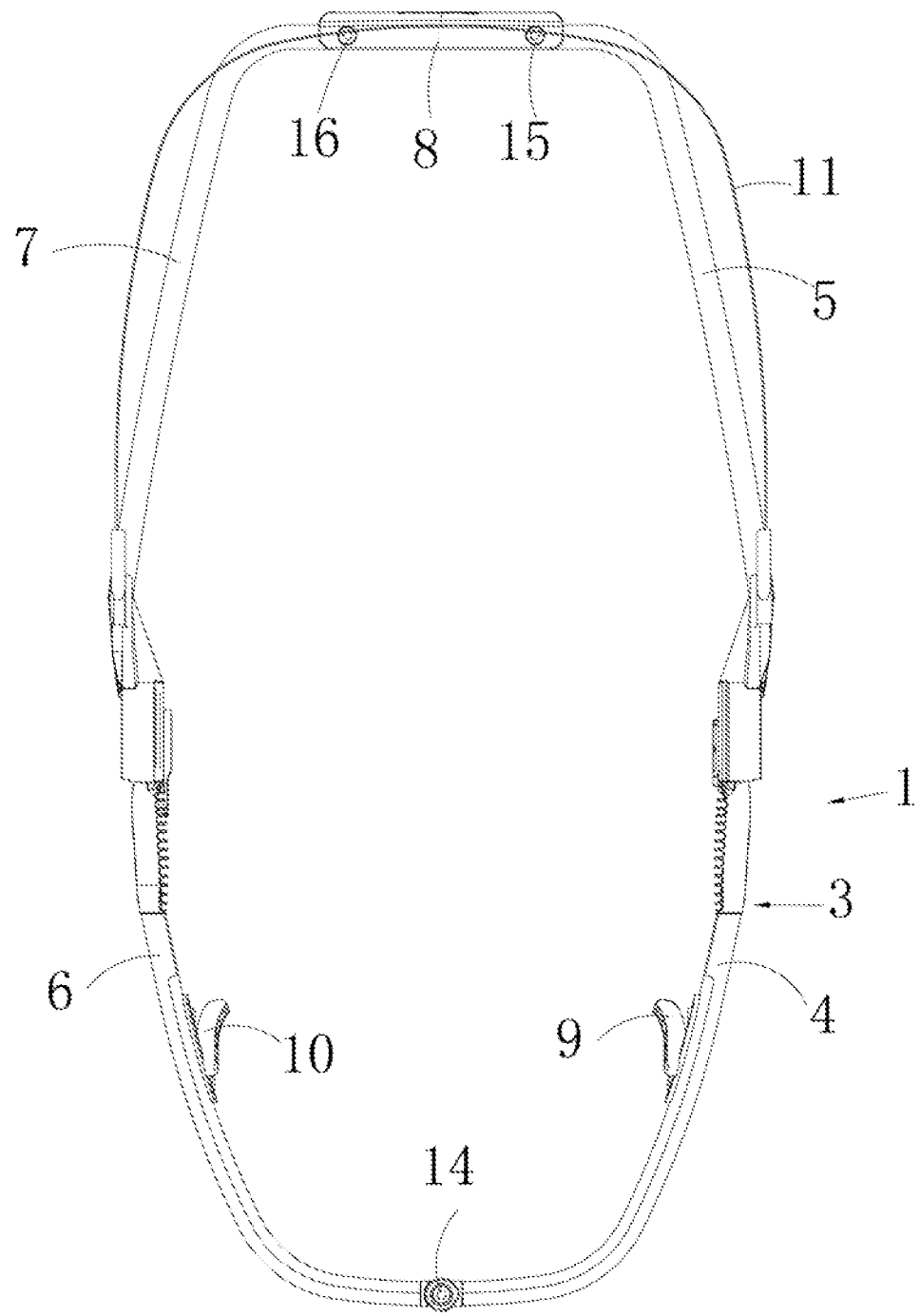
FIG. 2 is a front view of a seat frame according to the invention, wherein the seat frame is in an unfolded status.
Figure 3:
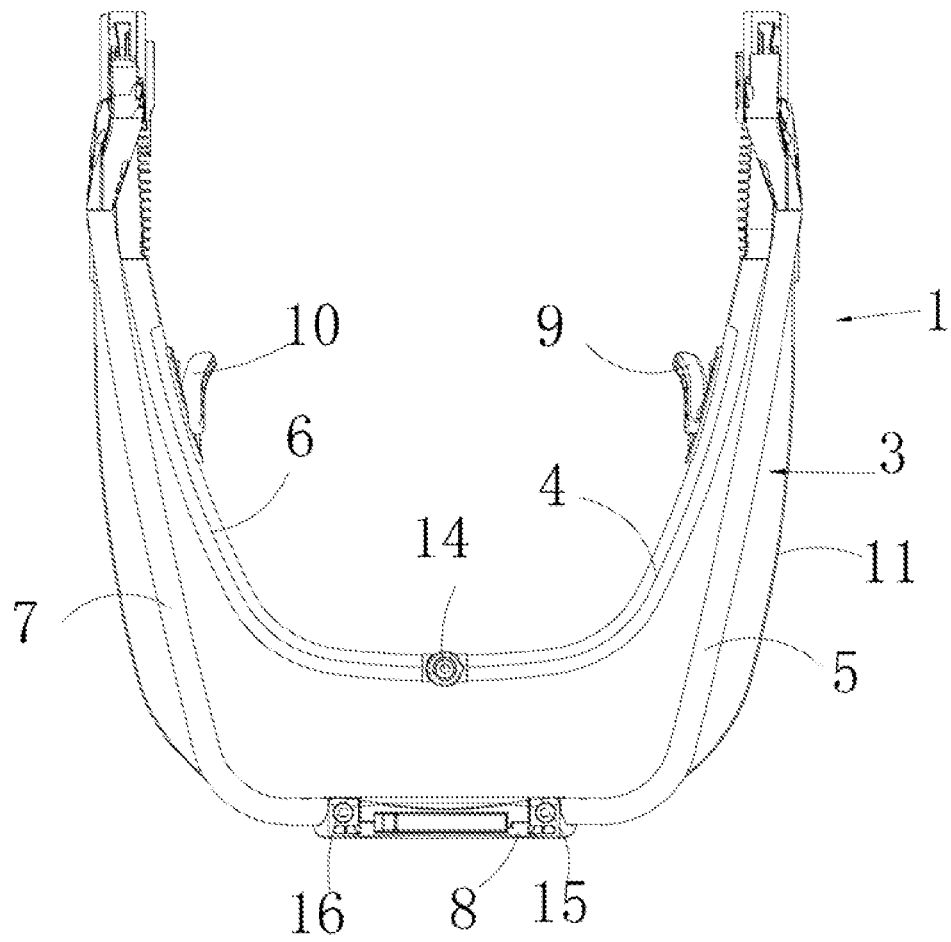
FIG. 3 is a front view of a seat frame according to the invention, wherein the seat frame is in a status of converting from the unfolded status to the folded status.
Figure 4:
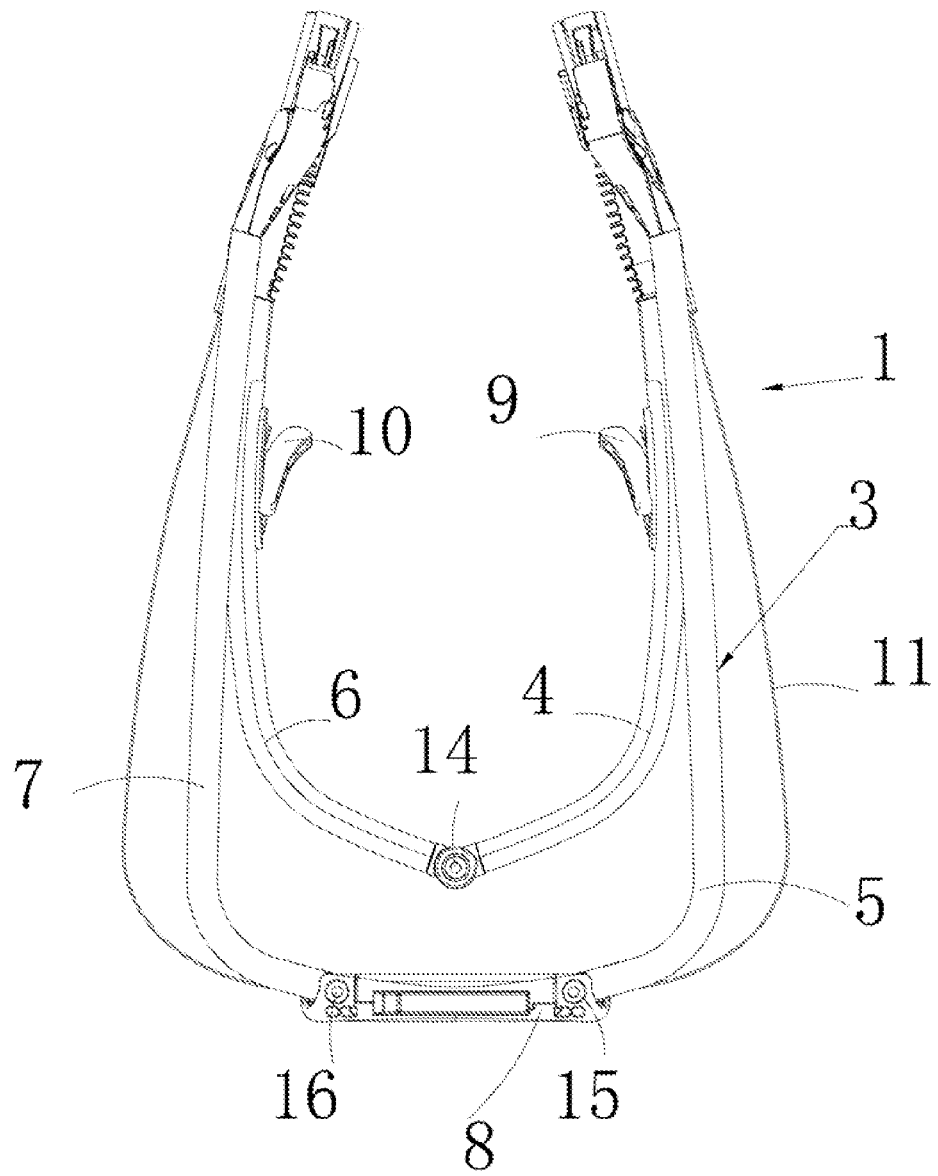
FIG. 4 is a front view of a seat frame according to the invention, wherein the seat frame is in a folded status.
Figure 5:
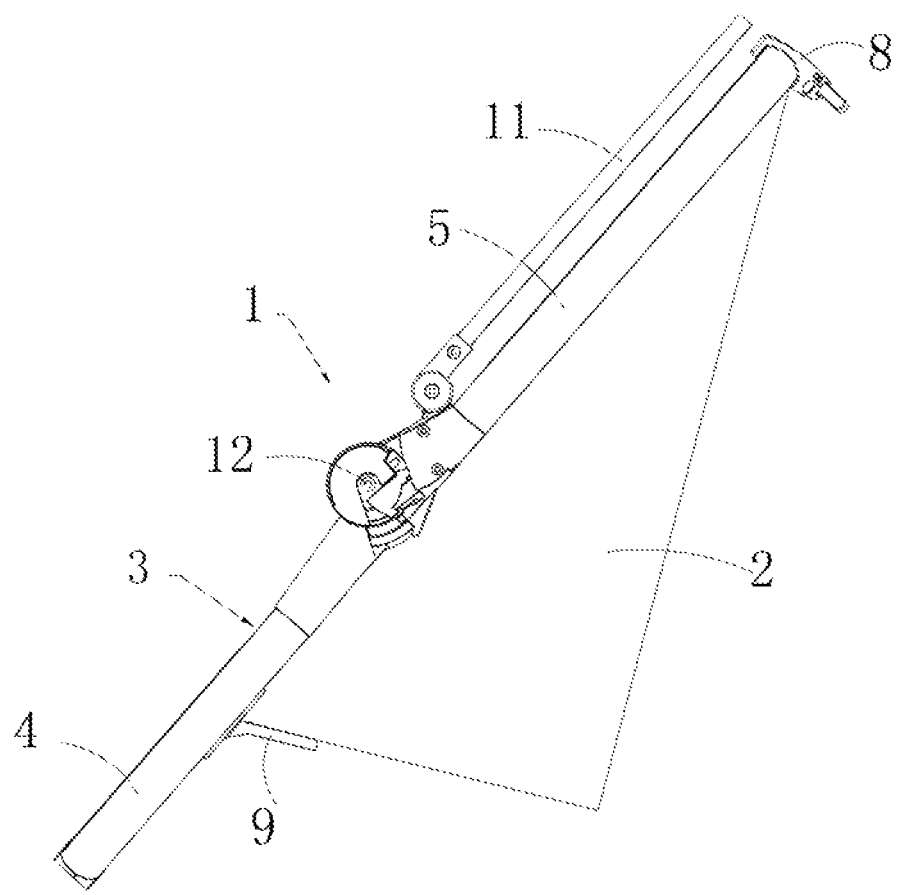
FIG. 5 is a right view of a seat frame according to the invention, wherein the seat frame is in an unfolded status.
Figure 6:
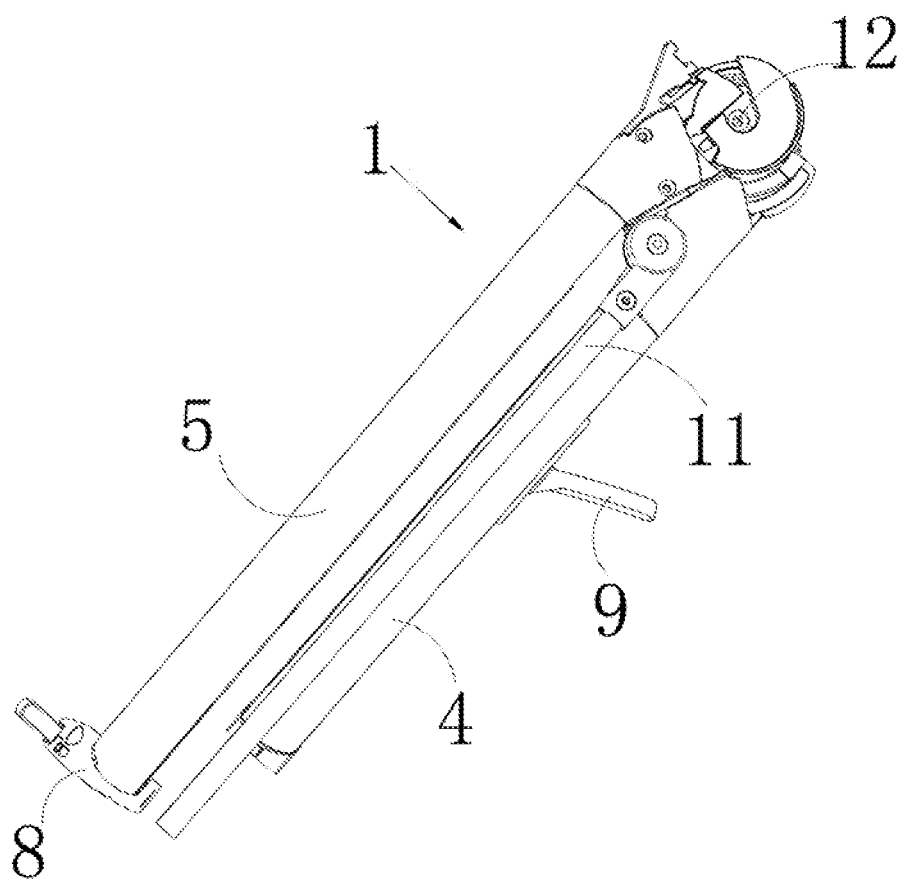
FIG. 6 is a right view of a seat frame according to the invention, wherein the seat frame is in a folded status.

As shown in figures, a child seat unit comprising a seat frame 1 having an unfolded position and a folded position, a seat cover 2 disposed on the seat frame 1, and locking devices for locking the seat frame 1 in the unfolded position, wherein the seat cover 2 is shown in FIG. 5.

The seat frame 1 comprises a framework 3 which is configured as a closed frame when the seat unit 1 is in the unfolded position, the seat frame 1 also comprises a left lower bracket 4 located on the left side, a left upper bracket 5 with one end being rotatably connected to one end of the left lower bracket 4 by a left first shaft 12, a right lower bracket 6 located on the right side, and a right upper bracket 7 with one end being rotatably connected to one end of the right lower bracket 6 by a right first shaft 13, the other end of the left lower bracket 4 is rotatably connected to the other end of the right lower bracket 6, and the other end of the left upper bracket 5 is rotatably connected to the other end of the right upper bracket 7.

The shaft axis of the left first shaft 12 and the shaft axis of the right first shaft 13 extend along the left-right direction respectively, when the seat frame 1 is in the folded position, the other end of the left lower bracket 4 and the other end of the left upper bracket 5 draw together, and the other end of the right lower bracket 6 and the other end of the right upper bracket 7 draw together, and the left first shaft 12 and the right first shaft 13 draw together.

Preferably, the shaft axis of the left first shaft 12 and the shaft axis of the right first shaft 13 coincide.

The other end of the left lower bracket 4 is rotatably connected to the other end of the right lower bracket. In this embodiment, the other end of the left lower bracket 4 is rotatably connected to the other end of the right lower bracket 6 by a second shaft 14, and the left first shaft 12, the right first shaft 13 are spatially perpendicular to the second shaft 14 respectively. Alternatively, the left lower bracket 4 also can be rotatably connected to the right lower bracket 6 by means of an intermediate part as described hereinafter for the connection of the left upper bracket 5 and the right upper bracket 7.

The other end of the left upper bracket 5 is rotatably connected to the other end of the right upper bracket 7. In this embodiment, the framework 3 also includes an upper connecting member 8, the other end of the left upper bracket 5 is rotatably connected to one end of the upper connecting member 8 by a third shaft 15, and the other end of the right upper bracket 7 is rotatably connected to the other end of the upper connecting member 8 by a fourth shaft 16, wherein the left first shaft 12, the right first shaft 13 are spatially perpendicular to the third shaft 15 and the fourth shaft 16 respectively. In such an embodiment, the seat frame 1 can be provided with one or two upper connecting members 8, if two, and then the left upper bracket 5, the two upper connecting members and the right upper bracket 7 can be rotatably connected to each other in sequence. Similarly, the other end of the left upper bracket 5 also can be connected to the other end of the right upper bracket 7 by a rotating shaft.

The seat frame 1 further includes a left seat rod 9 with one end being fixed on the left lower bracket 4, and a right seat rod 10 with one end being fixed on the right lower bracket 6, when the seat frame is in the unfolded position, the left seat rod 9 stretches backwardly from the left lower bracket 4 and the right seat rod 10 stretches backwardly from the right lower bracket 6. Furthermore, the seat cover 2 includes a seat portion disposed on the left seat rod 9 and the right seat rod 10.

The locking devices includes a left locking device disposed between one end of the left lower bracket 4 and one end of the left upper bracket 5, and a right locking device disposed between one end of the right lower bracket 6 and one end of the right upper bracket 7. The specific configurations of the left and right locking devices are not main points of the invention, any locking mechanisms capable of achieving the locking function between two rotatable parts are applicable herein, such as, a first locking groove deviating from the left first shaft 12 is opened on one end of the left lower bracket 4, and a first locking block is slidably provided on one end of the left upper bracket 5, so that the left lower bracket 4 and the left upper bracket 5 can be locked with each other when the first locking block inserts into the first locking groove.

The foregoing child seat unit can be used separately or mounted on the support frame of articles for child as a part thereof, such as a wheeled child conveyance, a wheeled child conveyance comprises a cart frame, multiple groups of wheel assembly arranged on the bottom of the frame, and the child seat unit can be detachably disposed on the cart frame, the specific ways of detaching are various and are not described more detail herein, because which are not the main points of the invention. Additionally, the child seat unit of the invention also can be mounted on other devices for child such as child seat, child rocking chair or the like.

It is to be noted, however, that the above embodiments are only given to illustrate the technical conception or technical features of the present invention, the aim is intended to enable a person skilled in the art to appreciate the content of the invention and further implement it, and thus the protecting scope of the utility can not be limited hereby. Also, any equivalent variations or modifications made according to the spirit of the invention should be covered within the protecting scope of the invention.

What is claimed is:

1. A seat unit for child comprising a seat frame (1) having an unfolded position and a folded position, a seat cover (2) disposed on the seat frame (1), and a locking device for locking the seat frame (1) in the unfolded position, the seat frame (1) including a framework (3) which is configured as a closed frame when the framework (3) is in the unfolded position, wherein framework (3) comprising:

a left lower bracket (4) located on a left side of the seat frame;

a left upper bracket (5) with a bottom end being rotatably connected to a top end of the left lower bracket (4) by a left first shaft (12);

a right lower bracket (6) located on a right side of the seat frame;

a right upper bracket (7) with a bottom end being rotatably connected to a top end of the right lower bracket (6) by a right first shaft (13);

the bottom end of the left lower bracket (4) being directly and rotatably connected to the bottom end of the right lower bracket (6), the top end of the left upper bracket (5) being rotatably connected to the top end of the right upper bracket (7), the shaft axis of the left first shaft (12) and the shaft axis of the right first shaft (13) extending along a left-right direction respectively, wherein when the seat frame (1) is in the folded position, the bottom end of the left lower bracket (4) and the top end of the left upper bracket (5) draw together, and the bottom end of the right lower bracket (6) and the top end of the right upper bracket (7) draw together to reduce the size of the child seat in anterior-posterior direction, and the left first shaft (12) and the right first shaft (13) draw together to reduce the size of the seat in left-right direction, and wherein the framework (3) comprises an upper connecting member (8), the top end of the left upper bracket (5) being rotatably connected to a left end of the upper connecting member (8) by a third shaft (15), the top end of the right upper bracket (7) being rotatably connected to a right end of the upper connecting member (8) by a fourth shaft (16), wherein each shaft including an axis through the shaft in longitude direction, and wherein the axis of the left first shaft (12) and the axis of the right first shaft (13) being spatially perpendicular to the axis of the third shaft (15) and the axis of the fourth shaft (16) respectively.

2. The seat unit as claimed in claim 1, wherein the shaft axis of the left first shaft (12) and the shaft axis of the right first shaft (13) coincide.

3. The seat unit as claimed in claim 1, wherein the bottom end of the left lower bracket (4) is rotatably connected to the bottom end of the right lower bracket (6) by a second shaft (14), the left first shaft (12) and the right first shaft (13) being spatially perpendicular to the second shaft (14) respectively.

4. The seat unit as claimed in claim 1, the seat frame (1) further comprising a left seat rod (9) with one end being fixed on the left lower bracket (4), and a right seat rod (10) with one end being fixed on the right lower bracket (6), wherein when the seat frame (1) is in the unfolded position, the left seat rod (9) stretches backwardly from the left lower bracket (4), and the right seat rod (10) stretches backwardly from the right lower bracket (6).

5. The seat unit as claimed in claim 4, wherein the seat cover (2) includes a seat portion disposed on the left seat rod (9) and the right seat rod (10).

6. The seat unit as claimed in claim 1, wherein the locking device includes a left locking device disposed between the top end of the left lower bracket (4) and the bottom end of the left upper bracket (5), and a right locking device disposed between the top end of the right lower bracket (6) and the bottom end of the right upper bracket (7).

7. A wheeled child conveyance comprising the seat unit as claimed in any one of the previous claims, wherein the wheeled child conveyance further comprises a chart frame and a plurality of wheel assemblies arranged on the bottom of the chart frame, the seat unit being detachably disposed on the chart frame.

* * * * *